(12) United States Patent
Ducret

(10) Patent No.: US 7,554,041 B2
(45) Date of Patent: Jun. 30, 2009

(54) CLICK-FIT CONNECTOR FOR ARMORED CABLES

(76) Inventor: Lucien Ducret, 392 Pacific St., Stamford, CT (US) 06902

( * ) Notice: Subject to any disclaimer, the term of this patent is extended or adjusted under 35 U.S.C. 154(b) by 0 days.

(21) Appl. No.: 11/646,943

(22) Filed: Dec. 29, 2006

(65) Prior Publication Data
US 2008/0156526 A1 Jul. 3, 2008

(51) Int. Cl.
*H02G 3/18* (2006.01)
(52) U.S. Cl. .................. 174/655; 174/660; 174/662; 174/664; 16/2.1; 248/56; 439/604; 277/606
(58) Field of Classification Search ......... 174/650–660, 174/662, 664, 665, 59, 135; 439/583, 584, 439/462, 581, 604, 587, 98, 552, 557; 16/2.1, 16/2.2; 248/56; 277/606; 285/194, 921
See application file for complete search history.

(56) References Cited

U.S. PATENT DOCUMENTS 4,880,387 A * 11/1989 Stikeleather et al. .......... 439/98

* cited by examiner

*Primary Examiner*—Dhiru R Patel

(74) *Attorney, Agent, or Firm*—Y. Kateshov, Esq.

(57) ABSTRACT

A connector for an armored cable mountable to a wiring box has a body provided with two biasing components which are operative to engage opposite sides of the wall of the wiring box and operative to maintain the desired position of the connector upon mounting its body to the box.

19 Claims, 1 Drawing Sheet

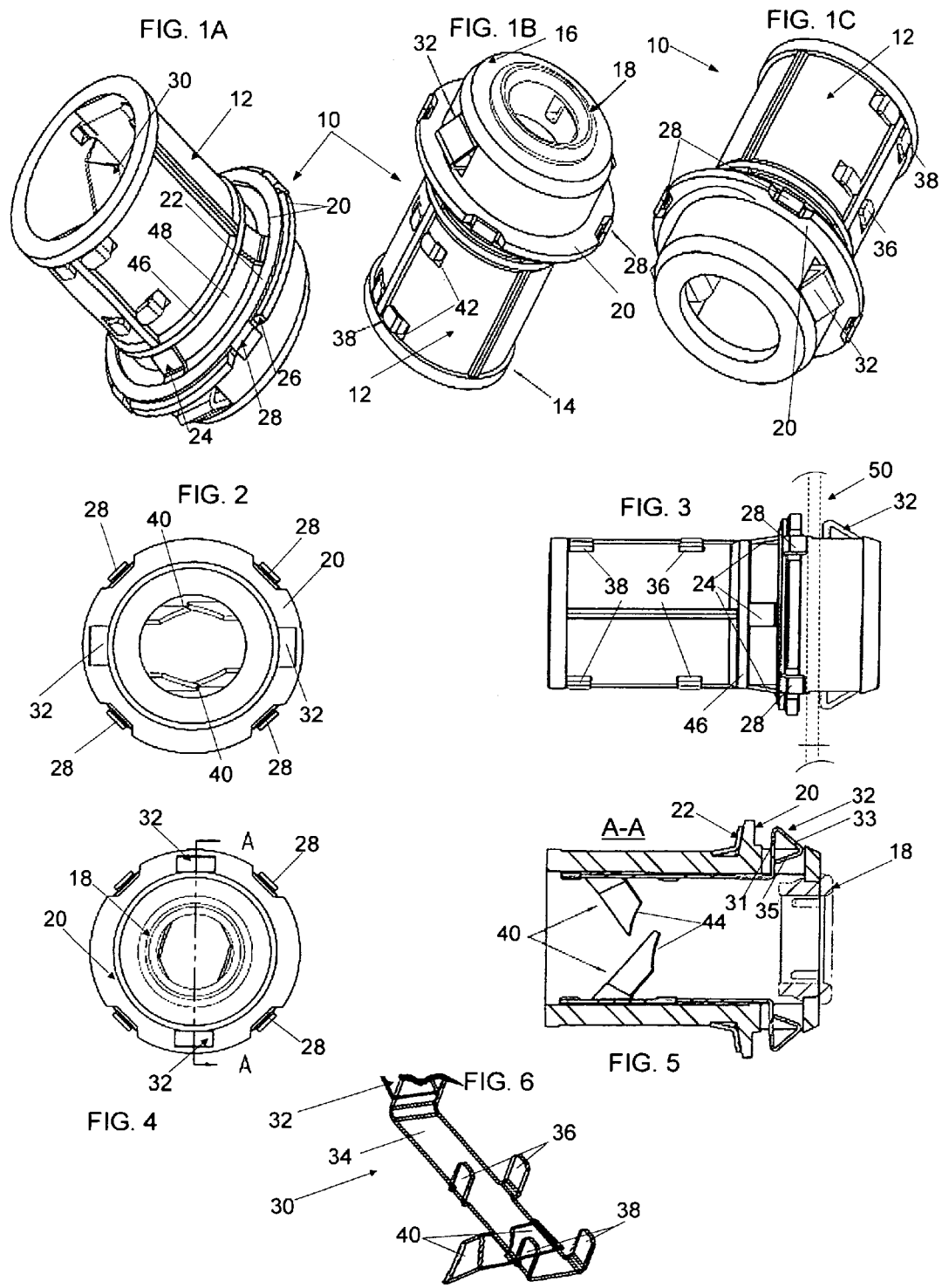

CLICK-FIT CONNECTOR FOR ARMORED CABLES

BACKGROUND OF THE INVENTION

1. Field of the Invention

The invention relates to click-fit connectors for securely mounting armored cables to a cable connector box.

2. Related Prior Art

A connector for armored cables including, but not limited to BX and MC cables, is configured to be removably mounted to a wiring box. Typically used in a space-deficient environment associated with electrical wiring, wiring boxes may not be easily or conveniently accessed. The wiring box has typically a housing provided with a bottom, a peripheral wall extending from the bottom, and a lid removably topping the peripheral wall and closing the interior of the box. The peripheral wall typically has a plurality of openings shaped and dimensioned to receive respective cable connectors. Typically, a cable connector is configured with a hollow body traversed by a cable which is secured to the connector by screws or other types of fasteners. The connector itself is, in turn, coupled to a wiring box by means of external fasteners. Hence mounting a cable connector traversed by an armored cable is usually an onerous and labor-intensive task.

To minimize the above-discussed disadvantages associated with installation of armored cables, a click-fit connector has become available. The click-fit connector type is characterized by a hollow body configured with an inner spring which is operative to securely bias the installed connector against a wiring box and retain a cable within the connector. However, in practice, the engagement between a connector and box is not reliable, and the installed cable often wobbles and slips out of engagement. Furthermore, the known configuration of the click-fit connector does not provide reliable grounding of the installed cable.

A need, therefore, exists for a click-fit connector for armored cables that has a configuration allowing for a reliable mounting thereof to an electrical box in a simple and time-effective manner.

A further need exists for a click-fit connector for armored cables that has a configuration providing reliable grounding of an armored cable which is inserted into the connector.

SUMMARY OF THE INVENTION

These needs are satisfied by the click-fit connection of the present disclosure.

In accordance with one aspect of the present disclosure, a click-fir connector is configured with a hollow body, and first and second resilient components coupled to the hollow body and operative to bias the hollow body against a wall of a wiring box in opposite directions. Upon pulling the disclosed click-fit connector through an opening, which is formed in a wall of wiring box, the first and second resilient components press against the opposite sides of the wall and prevent the installed connector from voluntary displacement relative to the box.

The first resilient component is configured as an elongated flexible body extending through the hollow interior of the connector's body between its rear and front ends. A lug provided on the front end of the first component is configured to extend transversely to the longitudinal axis of and through the front end of the hollow body and terminate at a radial distance from the hollow body of the connector. The lug has a generally V-shaped cross-section including a leaf which is biased axially rearwards from the front end of the flexible body. In the installed state of the connector, the leaf is in contact with and presses against the inner side of the box's peripheral wall which delimits the interior of the box.

Advantageously, the first resilient component is configured to provide a multiplicity of contacts between the front lug or lugs and the inner side of the peripheral wall. Accordingly, due to multiple contacts between the installed connector and the inner side of the box's wall, the connector is centered about the axis of symmetry of an opening in the wall of the box, through which the connector is pulled in.

The second resilient element includes at least one, but preferably multiple radially spaced prongs biased towards and pressing against the outer side of the wall of the box. In the installed state of the connector, the lugs and prongs engage the opposite sides of the wall of the box and minimize displacement of the installed connector relative thereto.

In accordance with a further aspect of the disclosure, the first resilient element is provided with a pair of wings resiliently pressing against a cable upon inserting the latter into the body of the connector. The configuration of the wings helps improve engagement between the cable and connector and allows only rotational motion of these components relative to one another. The resiliency of the wings is essential to maintaining contact between the armored jacket of the inserted cable and connector which is necessary for reliable grounding of the cable.

The above and other needs, objects, features, and advantages of the present invention will become apparent from the following description read in conduction with the accompanying drawings, in which like reference numerals designate the like elements.

BRIEF DESCRIPTION OF THE DRAWINGS

FIG. 1A is a perspective view of a click-fit connector configured in accordance with the present disclosure.

FIG. 1B is a perspective view of the click fit connector of FIG. 1A provided with an anti-short isolator.

FIG. 1C is another perspective view of the click-fit connector of FIG. 1A.

FIG. 2 is a front elevational view of the click-fit connector of FIGS. 1A and 1B.

FIG. 3 is a side elevational view of the click-fit connector of FIGS. 1A and 1B.

FIG. 4 is a front elevational view of the click-fit connector of FIG. 1B.

FIG. 5 is a cross-sectional side view of the click-fit connector taken along lines A-A of FIG. 4.

FIG. 6 is a perspective view of a first resilient component mountable to the interior of the click-fit connector of FIGS. 1-5 and operative to stabilize the connector in its installed state relative to a wiring box and to provide reliable grounding of a cable received in the in the connector.

DETAILED DESCRIPTION OF PREFERRED EMBODIMENTS

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner.

The words "connect," "couple," and similar terms with their inflectional morphemes do not necessarily denote direct and immediate connections, but also include connections through mediate elements or devices.

Referring now to FIGS. 1A, 1C and 3, a connector 10 is configured with a hollow body 12 traversed by an armored cable, such as XK-290 or BX which has a helical armored jacket, which is not shown but well known to those skilled in the wiring electrical art. The body 12 is, then, mounted to a wall 50 (diagrammatically shown in FIG. 3) of wiring box with the inner end of the inserted cable protruding into the interior of the box.

As shown in FIGS. 1A through 1C, body 12 includes a bushing 16 and a shaft 14 (FIG. 1B), respectively, with the front end of bushing 16 terminating within the interior of the box in the installed state of connector 10. The bushing 16 and shaft 14 may be manufactured as two separate components assembled together to define preferably, but not necessarily, substantially cylindrical body 12. Alternatively, bushing 16 and shaft 14 may be manufactured as a unitary component. The bushing 16 is configured with a collar 20 (FIG. 1B) provided between the front and rear portions of the busing and extending radially outwards from the periphery of hollow body 12. In the installed state of connector 10, collar 20 is juxtaposed with the outer side of wall 50 (FIG. 3) of a wiring box and configured so as to prevent uncontrollable displacement of connector 10 through wall 50 into the interior of the box. The front end of bushing 16 may be chamfered to facilitate insertion of the bushing through the opening of wall 50 of the box.

The shaft 14 is configured with a flange 46 (FIG. 1A) surrounding the rear end of bushing 16 and, thus extending radially outwards from the peripheral of bushing 16. Accordingly, the sides of respective collar 20 and flange 46, which face one another, define an annular channel or groove 48 (FIG. 1A) therebetween which is configured to receive a washer 22 operative to bias connector 10 away from wall 50 of the box, as discussed in detail below.

The collar 20 is machined with a plurality of notches 26 (FIG. 1A) spaced angularly from one another around the outer periphery of collar 20 at, preferably, a uniform distance and shaped to receive respective prongs or fingers 28 of washer 22 which extend from the outer peripheral edge of washer 22 and are, cumulatively, referred to as a resilient or biasing component. The prongs or fingers 28 each are angled with a free end thereof extending beyond the front face of collar 20 and resiliently urging against the outer side of wall 50 (FIG. 3) of the box in the installed state of connector 10. As a result, body 12 of connector 10 is biased rearwards from the wall 50 in the installed state of connector 10. The inner radial side of washer 22 has a plurality of arms 24 (FIG. 1A) spaced from one another at preferably a uniform distance and located so that each pair of adjacent arms 24 flank a respective one of prongs or fingers 28 in between them. The arms 24 each extend along the longitudinal axis of elongated body 12 in a rearward direction and have its free portion pressing against flange 46 and, thus, generating a frontward-directed force compensating for the force generated by prongs or fingers 28 in the installed state of connector 10. With the configuration disclosed immediately above, washer 22 has generally a Z-shaped cross-section allowing prongs or fingers 28 to be in continuous contact with wall 50 of the wiring box in the installed state of the connector. FIG. 4 as indicated on the replacement sheet submitted with this amendment document. In particular, the eccentric element 41 is now diagrammatically shown in phantom lines.

While prongs 28 have been disclosed on washer 22, alternatively, collar 20 may have spaced-apart prongs functionally analogous to prongs or fingers 28, but formed integrally with the outer peripheral side of collar 20. Such a configuration of connector 10, although not illustrated but readily understood by one of ordinary skill, has fewer components than the embodiment of FIGS. 1A-1C, since the connector does not need to be assembled with a separate washer.

Turning to FIGS. 1B, 4 and 5, connector 10 further has an anti-short bushing 18 press-fit into bushing 16. The assembly of bushings 18 and 16 is configured to prevent chaffing of the electrical wires of the inserted cable.

Referring to FIGS. 1B, 3 and 6, connector 10 further has another biasing component configured as a flexible spring 30 (FIG. 6) which is removably mounted to the interior of body 12. The spring 30 is operative to bias body 12 of connector 10 frontward from wall 50 of the box in the installed state of connector 10. Configured with a flexible elongated body 34 (FIG. 6), spring 30 has a front lug 32 which extends transversely to elongated body 34 through an opening in bushing 16 (FIG. 1B) and terminates at a radial distance from body 12 of connector 10.

Referring further to FIGS. 5 and 3, front lug 32 is formed by bending the front end of body 34 so that it assumes a substantially triangularly shaped cross-section having a first side 31, which extends transversely to body 34, and two sides 33 and 35 (FIG. 5). The sides 33 and 35 extend angularly relative to one another with the free end of side 35 terminating in a close proximity to side 31. Such a configuration allows front lug 32 to abut the inner face of wall 50 (FIG. 3) by side 31 in the installed state of connector 10 and press thereagainst so as to bias connector 10 frontward from wall 50 and, thus, opposite to the rearward direction in which the connector is biased by prongs or fingers 28 of washer 22. As a result, connector 10 is substantially displaceably fixed relative to wall 50 of the box. Furthermore, since both resilient components—prongs 28 and front lug 32—are flexible, connector 10 can be displaceably fixed to wall 50 of the box practically regardless of the thickness of the wall, which is important because the wall thickness is not standardized.

Returning to FIGS. 6 and 1B, spring 30 further has an intermediary pair of lugs 36 and a rear pair of lugs 38 (FIG. 6) configured to extend through respective holes in body 12 of connector 10, as shown in FIG. 1B. Once lugs 36 and 38, respectively, protrude beyond body 12, their respective free ends are bent to conform to the outer periphery of body 12, thus, displaceably fixing spring 30 to body 12.

As also shown in FIG. 6, spring 30 further has a pair wings 40 provided on body 34 between intermediate and rear pairs of lugs 36 and 38, respectively, and extending in a direction opposite to the direction of extension of these lugs. In other words, wings 40 extend inwards and are in contact with a helical jacket of cable when the latter is pulled through the hollow body 12 of connector 10. Due to the flexibility of spring 30, wings 40 resiliently press against the cable's jacket as the cable and assembled connector 10 rotate relative to one another during insertion of the cable into connector 10. The free ends 44 of wings 40 are slanted to conform to the helical thread of the cable's jacket, and the length of one of the wings is greater than the length of the other wing. The continuous contact of wings 40 with the jacket of the cable also improves grounding characteristics of connector 10.

Preferably, two or more springs 30 are mounted to the diametrically opposite regions of the interior of connector 10 to have front lugs 32 of respective springs 30 provide multiple, spaced-apart contact points between connector 10 and wall 50 of the wiring box which improve stability and positioning of connector 10 relative to the wiring box. However, as readily understood by an artisan, single spring 30 can be provided with two front lugs 32 coupled to the front end of spring 30 and extending in opposite direction relative to one another.

During an initial installation of connector 10, body 12 is first tilted so that one of front lugs 32 of respective springs 30 is pulled through an opening in wall 50 of wiring box and engages the inner side of wall 50. Thereafter, upon pushing connector 10 frontward, the other front lug 32 is depressed upon contact with the periphery of the opening allowing connector to snap in place so that the opposite sides of wall 50 are pressed upon by respective front lugs 32 and prongs 28 of washer 22. In the installed state of connector 10, its axial displacement is, thus, arrested, but its rotation relative to wiring box is possible upon applying a torque to body 12.

Subsequently, an armored cable or flexible conduit connector is pushed inside body 12 of connector 10 while, along a way, deflecting wings 40. Due to the configuration of wings 40, the cable can only advance frontward, but its linear displacement in a rearward direction is arrested by wings 40 pressing against the helical thread of the cable. With the cable inserted through hollow body 12, the armored jacket of the cable presses against front lugs 32 preventing these lugs from displacing radially inwards, which, otherwise, would result in disengagement of connector 10 from the wiring box.

In case of a wiring mistake or a need for retrofitting mounted connector 10, body 12 of connector 10 rotates, for example, in a clockwise direction allowing the cable to rotate in the opposite direction out of engagement with connector 10. Alternatively, of course, the cable may be rotated in a counterclockwise direction until it is out of engagement with connector 10.

Having described at least one of the preferred embodiments of the present invention, which was conceived in 2005 and reduced to practice in 2006, with reference to the accompanying drawings, it is to be understood that the invention is not limited to those precise embodiments, and that various changes, modifications, and adaptations may be effected therein by one skilled in the art without departing from the scope or spirit of the invention as defined in the appended claims.

What is claimed is:

1. A connector for introducing an armored cable into a wiring box, comprising:
    a hollow body;
    a first biasing component coupled to the hollow body and operative to press against an inner face of a wall of the wiring box in an installed state of the connector, the first biasing component being configured with a plurality of angularly spaced-apart lugs extending transversely to a longitudinal axis of the hollow body through a front end thereof and each operative to exert the force against the inner face of the wall of the wiring box in the installed state of the connector; and
    a second biasing component coupled to the body at a distance from the first biasing component and operative to press against an outer face of the wall in the installed state of the connector, the first and second biasing components generating respective oppositely-directed forces directed against the wall of the wiring box and minimizing voluntary disengagement of the connector from the wiring box.

2. The connector of claim 1, wherein the lugs each have a plurality of leaves coupled to one another to one another so as to exert the force against the inner face of the wall.

3. The connector of claim 2, wherein the plurality of leaves of each of the lugs are configured to define a substantially triangularly-shaped cross-section.

4. The connector of claim 1, wherein the first biasing component is fixed to the front end of the hollow body.

5. The connector of claim 1, further comprising at least one elongated spring extending within the hollow body between front and a rear ends of the hollow body and integrally provided with the first biasing component, the first biasing component including a front lug on a front end of the spring and extending transversely to a longitudinal axis of the hollow body through the front end thereof so as to terminate at a radial distance from the body and press against the inner face of the wall in the installed state of the connector, the front lug being biased radially outwards by the armored cable inserted through the hollow body, wherein the inserted armored cable and the front lug are in continuous contact with one another for providing grounding of the armored cable.

6. The connector of claims 5, further comprising a second elongated spring extending through the hollow body at a distance from the one spring and having a respective front lug, the respective front lug extending transversely to the longitudinal axis of the hollow body through the front end of the body and terminating at an angular distance from the front lug of the one spring, the first biasing components of the respective one and second springs being uniformly configured to provide multiple spaced contact points with the inner face of the wall of the wiring box.

7. The connector of claim 6, wherein the one and second elongated springs each have an intermediate pair of prongs and a rear pair of prongs spaced from the front lug and from one another, the prongs of the intermediate and rear pairs extending radially outwards through respective passages in the hollow body in the installed state of the connector and bendable so as to conform to an outer surfaces of the hollow body to prevent displacement of the elongated spring relative to the hollow body.

8. The connector of claim 6, wherein the elongated springs each have a pair of spaced apart wings extending inwards and operative to engage a helical jacket of the armored cable inserted through the hollow body so that the cable is displaceable frontward in response to rotating the body relative to the cable in one direction and displaceable rearward out of engagement with the body upon rotating the body in a direction opposite to the one direction.

9. The connector of claim 8, wherein the wings have respective lengths differing from one another, the wings each having a slanted free end configured to engage a spiral of the helical jacket of the armored cable and biased thereagainst to maintain constant contact with the cable for providing grounding of the cable.

10. The connector of claim 1, wherein the hollow body has a front bushing and a shaft coupled to the bushing and extending rearwards therefrom, the bushing and shaft having respective collar and flange spaced apart and extending radially outwards from the hollow body so as to define a groove therebetween.

11. The connector of claim 10, further comprising a washer having an outer periphery provided with the second biasing component, the washer being coupled to the collar of the bushing having a plurality of spaced-apart notches, the second biasing component extending frontward through the plurality of spaced-apart notches and terminating beyond the collar so as to resiliently press against the outer face of the wall of the wiring box in the installed state of the connector.

12. The connector of claim 11, wherein the second biasing component has a plurality of angularly spaced-apart flexible fingers extending through the respective notches of the collar of the bushing in the installed state of the connector.

13. The connector of claim 11, wherein the washer has an inner periphery provided with a plurality of spaced apart arms extending rearwards over the groove towards and pressing against the flange of the shaft so as to displaceably fix the washer to the collar of the bushing.

14. The connector of claim 1, wherein the hollow body is configured with a collar extending radially outwards from the hollow body and formed integrally with the second biasing component, the second biasing component having a plurality of spaced apart fingers extending frontward beyond the collar and resiliently pressing against the outer face of the wall of the wiring box in the installed state of the connector.

15. The connector of claim 1, further comprising an isolator insertable into the hollow body through a frond end thereof and configured to prevent chaffing of electrical wires of the armored cable.

16. A connector configured to receive an armored cable and mountable to a wall of a wiring box, comprising:
 an elongated hollow body extending along a longitudinal axis between spaced front and rear ends of the hollow body;
 a plurality of spaced elongated springs extending through the hollow body and coupled thereto, the elongated springs each having a lug extending through the front end of the hollow body and operative to resiliently press against an inner side of the wall of the wiring box in an installed state of the connector;
 a support assembly extending radially outwards from the hollow body between the front and rear ends thereof; and
 a plurality of spaced-apart fingers provided on the support assembly and operative to resiliently press against an outer side of the wall of the wiring box in the installed state of the connector, wherein the lugs and fingers generate respective biasing forces directed in opposite axial directions in the installed state of the connector and minimizing involuntary displacement of the connector relative to the wiring box.

17. The connector of claim 16, wherein the support assembly is configured with a collar integrally provided on the hollow body and a washer mountable to the collar and having the plurality of fingers, the collar having a plurality of spaced peripheral notches traversed by the respective fingers, the fingers terminating beyond the collar so as to press against the outer side of the wall of the wiring box in the installed state of the connector.

18. The connector of claim 17, wherein the lugs of the respective springs each have a plurality of leaves displaceable relative to one another upon pressing against the inner side of the wall, the lugs being biased radially outwards by the armored cable extendable through the hollow body, wherein the armored cable and the lugs are in continuous contact to provide grounding of the cable.

19. The connector of claim 18, wherein the springs each have a pair of wings extending radially inwards and configured to resiliently engage a helical thread of a jacket of the armored cable, the wings being deflected upon frontward linear displacement of the armored, but operative to slide along the helical thread while the connector being rotated to allow rearward displacement of the cable out of engagement with the hollow body.

* * * * *